United States Patent [19]

Roman et al.

[11] 4,111,605
[45] Sep. 5, 1978

[54] COMPOSITE HINGELESS ROTOR HUB FOR ROTARY WING AIRCRAFT

[75] Inventors: Stephan Roman, Downingtown; Richard J. Spitko, Aston, both of Pa.

[73] Assignee: The Boeing Company, Seattle, Wash.

[21] Appl. No.: 751,121

[22] Filed: Dec. 16, 1976

[51] Int. Cl.² ............................................. B64C 27/38
[52] U.S. Cl. .................................... 416/141; 416/138
[58] Field of Search ................. 416/138 A, 140 A, 141

[56] References Cited

U.S. PATENT DOCUMENTS

| | | | |
|---|---|---|---|
| 2,757,745 | 8/1956 | Verhage et al. | 416/138 A X |
| 2,845,131 | 7/1958 | Laufer | 416/141 |
| 3,261,407 | 7/1966 | Culver et al. | 416/134 A X |
| 3,330,362 | 7/1967 | Kostan | 416/132 X |
| 3,667,863 | 6/1972 | Breuner | 416/141 |
| 3,695,779 | 10/1972 | Kastan et al. | 416/141 X |
| 3,797,964 | 3/1974 | Hanson | 416/134 A |
| 3,865,511 | 2/1975 | Breuner | 416/141 |
| 3,879,153 | 4/1975 | Breuner | 416/138 AX |

*Primary Examiner*—Everette A. Powell, Jr.
*Attorney, Agent, or Firm*—Paul & Paul

[57] ABSTRACT

Each rotor blade is rigidly affixed to a pair of strap members which are also rigidly connected to a rotor hub. Each strap member is defined as an elongated open box beam of rectangular cross section. Each strap member has its open web located on the side of the rectangle opposite that of its associated strap member of a pair. A pitch shaft which is located intermediate the two strap members associated with the given rotor blade, is rigidly attached to that rotor blade, and is rotatably connected with respect to the rotor hub. In alternative configurations, the strap members are configured as various alternative solid or open web designs, but all are configured as pairs having a pitch shaft therebetween.

20 Claims, 13 Drawing Figures

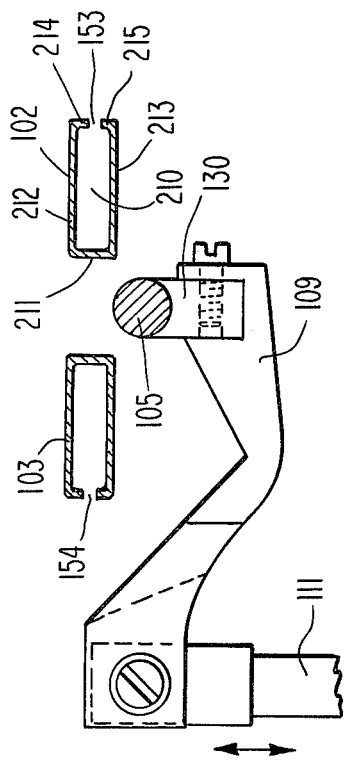
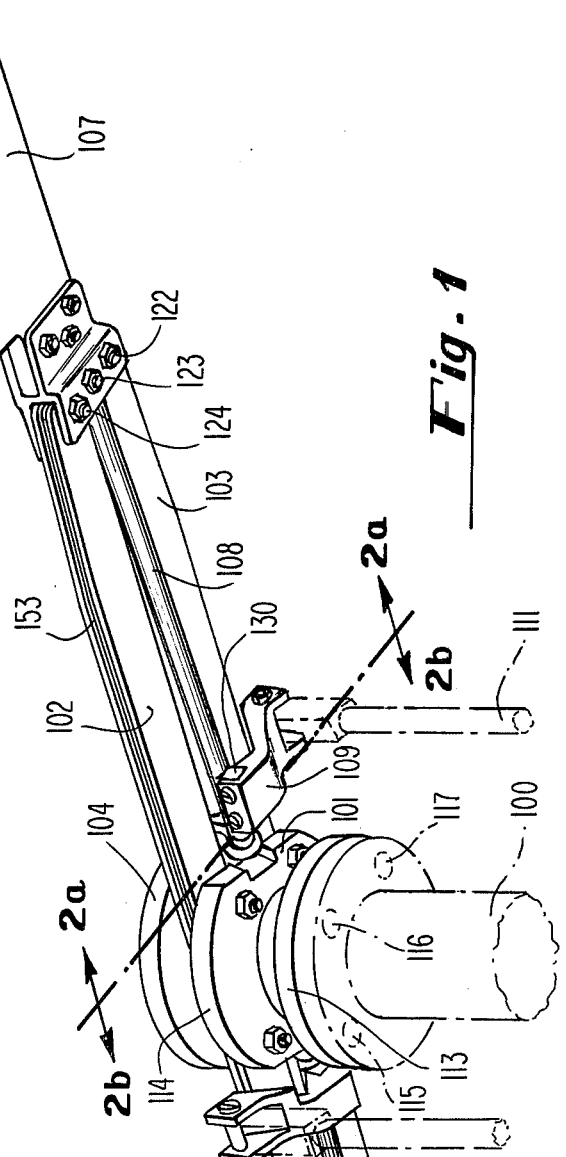
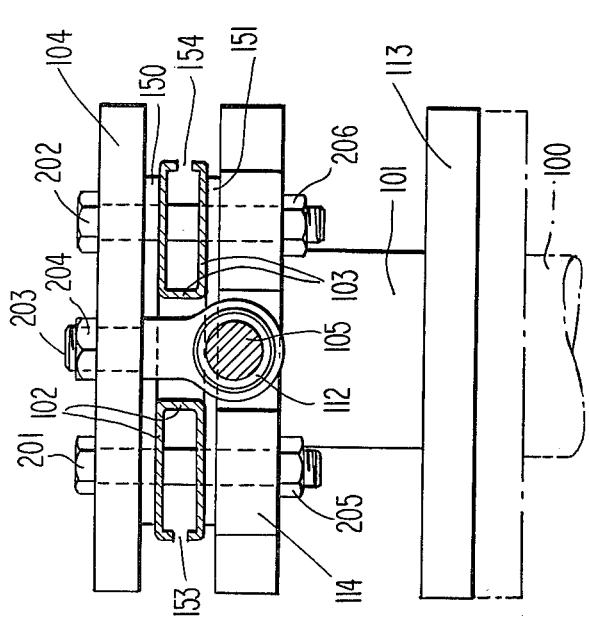

COMPOSITE HINGELESS ROTOR HUB FOR ROTARY WING AIRCRAFT

BACKGROUND OF THE INVENTION

This invention relates to hingeless composite rotor hubs for rotary wing aircraft, and more particularly to strap member configurations for connecting rotor blades to a central rotor hub in such systems.

Many of the basic design limitations of rotor and blade assemblies in rotary wing aircraft are reasonably well known. Thus, although the interaction of the various parameters is quite complex, the various loading, stress, bending, and the like factors, and their interaction with one another generally, are reasonably well formulated. Designers have considerable latitude to trade off these factors against one another, but certain basic performance factors stand as ultimate design goals, and the various components of the rotor system must in all events meet datum performance criteria.

One critical component in rotor systems or rotary wing aircraft is the central hub portion to which the rotor blades are attached. Basic operational constraints of rotary wing flight impose substantial functional complexity upon the hub, necessitated by various needs to control accurately multi-directional displacement of the blades, and to vary the pitch thereof. Variations in displacement, pitch, and stress upon the blades must be provided at different locations of the rotation cycle, in order to provide compensation for the well known loads, stresses, and aerodynamic factors to which the rotating blades are subjected. Further, the hub element must fulfill these various functions whether the aircraft is at rest, hovering, experiencing translational motion, or the like. Earlier designs involve complex articulated (i.e., multiple hinged) hubs and blades, but more recently hingeless systems have been developed which are intended to meet the various functional constraints generally involved with rotor hub systems, and furthermore to improve such base line parameters as structural simplicity, maintenance ease, low cost, and the like.

It is accordingly a primary object of the present invention to provide a composite hingeless rotor hub system which satisfies the various functional and structural limitations to which all rotor systems are subjected, and further which is reliable and relatively simple structurally, and advantageous from the standpoint of maintenance simplicity and cost.

It is a further object to provide such a hingeless rotor hub system wherein the simplicity of design also involves weight reduction, minimal manufacturing costs, and improved ease of installation.

In accordance with yet another object of the present invention, adaptability to folding rotor blade configurations and to either main or tail rotor configurations is highly desirable.

More particular functional objects of the present invention relate to the elimination altogether of heaving, or flap deflection caused by pitch control inputs, coupled with reduction of control loads, without imposition upon the necessary pitch variation capability.

Since hingeless rotor systems involve rigid attachment of the hub to the blades, it is another object of the present invention to provide a composite hingeless rotor hub possessing relatively low blade loads.

SUMMARY OF THE INVENTION

In its most basic terms, the present invention involves utilization of strap pairs interconnecting a central hub and a rotor blade, with a pitch shaft located between the straps of a pair, and being rigidly connected at the blade and pivotally connected at the hub.

The present invention involves a hingeless rotor system wherein rotor blades are attached to a hub member by means of pairs of straps having at least a partially open beam construction. The paired beam/straps have their open webs on opposite sides with respect to one another, and a pitch shaft runs between members of the pair to impart pitch variation upon the blade. The open box structure of the straps provides the requisite structural strength and the like for the system, but nevertheless may be flexed in a highly controllable fashion for pitch change when rotational force is applied to the pitch arm. The open box configuration permits extension of a given strap member continuously from a given blade, to the central hub member, and thence to another blade. Accordingly, rotor systems involving virtually any number of blades may be accommodated with ease, strength, simplicity, and overall functional advantage.

In an illustrative embodiment of the present invention, a rotor assembly involves a central hub member and a plurality of rotor blades, as well as a like number of strap members. Each strap member is configured as a generally rectangular open box beam, and each blade is coupled to the hub by means of a pair of substantially parallel strap members. In each such pair, the open web faces outward, and a pitch shaft extends from a rigid connection at the blade, between the two associated strap members, to a rotatable pitch control connection at the hub. In two bladed rotor systems, the open box beam strap members are linearly elongated and parallel, and each extends from blade to hub to blade. In multiple blade systems, each open box strap member is appropriately angularly configured to extend from rotor blade to hub to next adjacent rotor blade.

DESCRIPTION OF THE DRAWINGS

FIG. 1 shows an isometric view from beneath a hingeless rotor system in accordance with the principles of the present invention;

FIGS. 2a and 2b show cutaway views in opposite directions from the section line shown in FIG. 1;

DETAILED DESCRIPTION

Figure 3A:
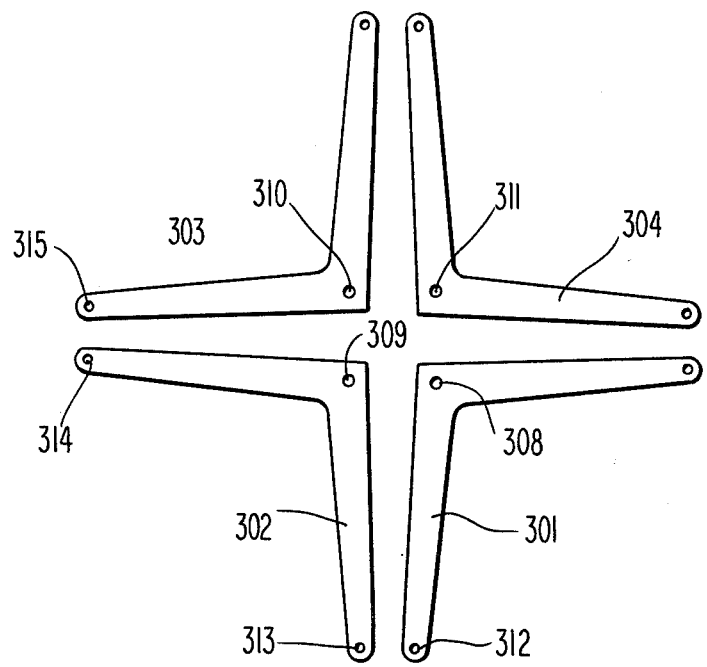
FIGS. 3a and 3b show configurations of strap members in accordance with the principles of the present invention respectively adapted to four and two bladed rotor systems.

In FIG. 1 there is shown an isometric view of an illustrative embodiment of the present invention as adapted to a two bladed rotor system, with the cutaway views of FIGS. 2a and 2b further illustrating the essential structural aspects of the FIG. 1 configuration. In those figures, a hub 101 has a lower flange 113 for mounting of the entire assembly to the aircraft power train 100, advantageously by bolts passing through openings such as 115 through 117. An upper flange 114 of hub 101 provides an upper surface for receiving strap members 102 and 103, and for fixedly mounting the strap members 102 and 103 in cooperation with an upper hub plate 104 and spacers 150 and 151. As may be seen most clearly in FIG. 2b, bolts 201 and 202 penetrate the hub plate 104, the respective strap members 102 and 103, spacers 150 and 151, and the upper flange 114 of hub 101, and are maintained in position by nuts 205 and 206.

The strap members 102 and 103 each extend continuously from opposing rotor blades 106 and 107, to which they are affixed by nut and bolt assemblies 119 and 121, and 122 and 124. Each of the straps 102 and 103 is configured as an open box beam, generally parallel with one another, each involving an open web 153 and 154 on the outside vertical surfaces thereof. That is, with particular reference to FIG. 2a, showing a cross section of the beams, the strap 102 includes a hollow interior 210 defined by upper and lower horizontal surfaces 212 and 213, an inner vertical surface 211, and an outer surface 214 and 215 opening to the interior 210, and forming an open web of the strap member 102. As may be noted from FIGS. 2a and 2b, the open webs of straps 102 and 103 are on the outside surface relative to one another, that is, on the side (e.g., 214 and 215) of a strap (e.g., 102) opposite the associated strap (e.g., 103) of a strap pair (e.g., 102 and 103).

Intermediate the two strap members 102 and 103, for each of the blades 106 and 107, is a respectively associated pitch shaft 105 and 108 for imparting pitch variation to the respectively associated blade. Pitch shaft 105 is rigidly connected to blade 106 by means of bolt assembly 120, and pitch shaft 108 is rigidly connected to blade 107 by means of bolt assembly 123. The hub ends of pitch shafts 105 and 108 are respectively rotatably mounted into pitch shaft bearings such as 112. As may be seen most clearly in FIG. 2b, the bearing carries the associated shaft 105 with an eye-bolt type bracket, which extends upwardly through a slot in hub plate 104 for bolted connection 203 and 204. Likewise, each of the pitch shafts 105 and 108 has a pitch arm installation for providing a pitch control input. Specifically, as may be best noted with reference to FIG. 2a, the pitch arm 109 is affixed to a matable protuberance 130 from pitch shaft 105, such that when vertical force is provided from below via 111 to the extreme end of the pitch arm 109, corresponding torque is applied to the pitch shaft 105. In accordance with the principles of the present invention, predetermined flex is thereby instituted in the strap members 102 and 103, and corresponding pitch variation occurs at the associated rotor blade 106. The bearings such as 112 are of the free-end rod type; not only is bi-directional rotation permitted, but furthermore slide-through motion may occur to accommodate angular flexing of the straps 102 and 103. Of course, a slide free fixed connection may also be suitable for those applications wherein there is desired an imposition upon the straps of bending load limitations.

Figure 3B:
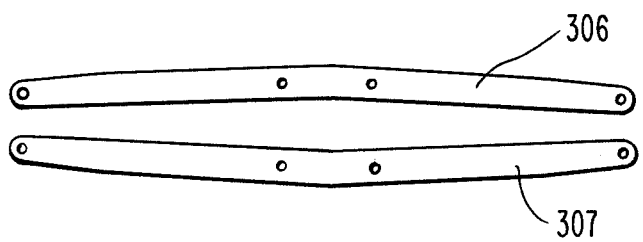

The adaptation straps in accordance with the principles of the present invention to a plural blade rotor configuration is illustrated in FIGS. 3a and 3b. FIG. 3b shows a strap arrangement for opposing double blades, such as the rotor system shown in FIG. 1. In FIG. 3b, strap elements 306 and 307 are substantially parallel, define openings at their centers for connection to the hub, and openings at either end for connection to the rotor blades. It will be noted that the upper and lower surfaces of strap members 306 and 307 taper somewhat between the central hub connection point and the outer blade connection point. It is further understood that a rotor blade is connected both to strap members 306 and 307 at one end, and that the other blade member is connected to strap members 306 and 307 at their other end. Further, the strap members 306 and 307 are also suitable for application in noncoplanar rotor systems having two opposing blades per each rotor plane.

FIG. 3a illustrates adaptation of the principles of the present invention to rotor systems having more than two coplanar blade elements. The FIG. 3a configuration is adapted for a four bladed rotor, but it will be apparent to those of ordinary skill that similar adaptation principles obtain in order to adapt the present invention to systems having a different number of blades. In FIG. 3a, four strap members 301 through 304 define four quadrants of the rotor plane. Each of the strap members 301 through 304 has a central portion, 308 through 311 respectively, for attachment to a hub. From the respective central points 308 through 311, the strap elements 301 through 304 each have two strap arms which extend outwardly at roughly right angles to one another. Further, each of the strap arms terminates in an opening adapted for direct and rigid coupling to a rotor blade. Adjacent strap arms are rigidly connected to a rotor blade in similar fashion to the two bladed system of FIG. 1. Hence, strap members 301 and 302 are connected to one rotor blade at points 312 and 313, respectively, strap members 302 and 303 are respectively connected to the next adjacent rotor blade at points 314 and 315, respectively, and so on. Each substantially parallel pair of strap arms which connects a given rotor blade to the hub defines a channel between the straps for location of a pitch shaft in the same fashion as provided in the FIG. 1 embodiment. Likewise, the details of providing pitch control to the associated rotor blades is identical to that set forth in FIG. 1. Finally, but probably most significantly, each of the strap members 301 through 304 has a generally rectangular, open box construction having a cross section such as shown in FIGS. 2a and 2b.

Figure 4:
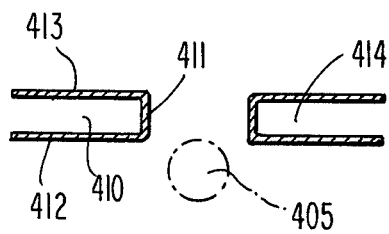
FIG. 4 shows a symbolic cross sectional view of an alternative embodiment of the present invention.

FIG. 4 shows in cross sectional schematic an alternative configuration for strap elements embodying the principles of the present invention. FIG. 4 roughly corresponds to the FIG. 2a cross section of the FIG. 1 embodiment, but in FIG. 4, the partially open outer wall of the box beam strap member has been removed completely, so that each strap element essentially constitutes, in cross section, a generally rectangular, outwardly facing "U"-shape. That is, each of the strap elements of FIG. 4 constitutes an inner vertical surface such as 411, and two flanges such as 412 and 413 outwardly depending therefrom, forming a central void which opens away from the corresponding opposite strap member 414 of the pair. A pitch shaft 405 is located intermediate the two strap members, in similar fashion to the embodiment of FIG. 1.

In a preferred embodiment, strap members embodying the principles of the present invention, such as 102 and 103 of FIG. 1, 306 and 307 of FIG. 3b, 301 through 304 of FIG. 3a, 410 and 414 of FIG. 4, and the embodiments of FIGS. 5a through 5g, are constructed of a fiberglass composite material. It will be apparent that numerous suitable alternative compositions will occur to those of ordinary skill in the air without departure from the spirit or scope of the present invention.

FIGS. 5a through 5g show cross sectional views of alternative configurations of strap and hub systems embodying the present invention. It is to be understood that the embodiments of FIGS. 5a through 5g are amenable to systems such as exemplified in FIGS. 3a and 3b, or similar systems to which the present invention may be adapted. In FIGS. 5a through 5g, respectively, pitch shafts 503, 505, 509, 511, 514, 516, and 520 are identical in structure and function to the pitch shaft 105 of FIG. 2a. In FIGS. 5a through 5g, however, different cross sectional configurations are presented for the strap members.

Figure 5A:
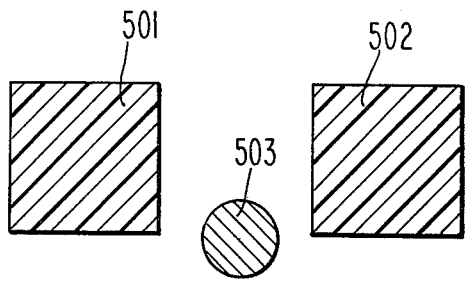
FIGS. 5a through 5g show cross sectional views of alternative strap configurations.
Figure 5B:
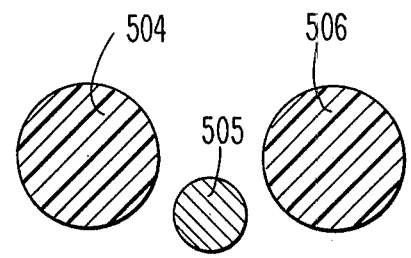

In FIG. 5a, strap members 501 and 502 are of a solid, rectangular configuration. In FIG. 5b strap members 504 and 506 employ a solid circular cross section.

Figure 5C:
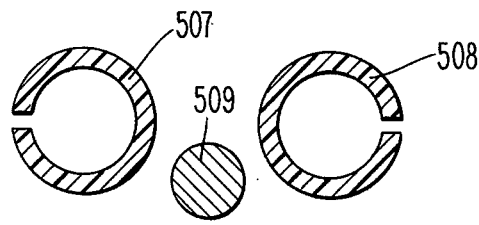

In FIG. 5c, strap members 507 and 508 employ a hollow, partially open cylindrical configuration.

Figure 5D:
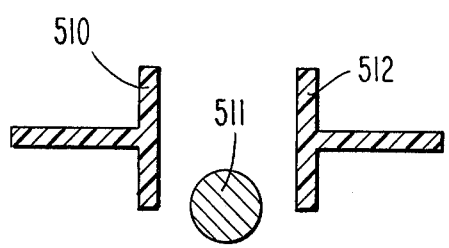
Figure 5E:
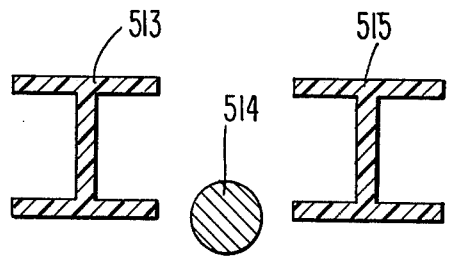
Figure 5F:
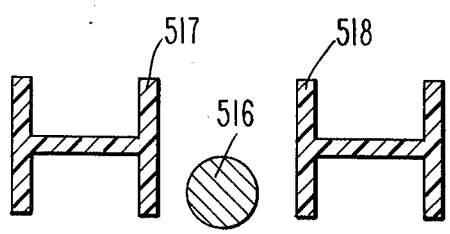
Figure 5G:
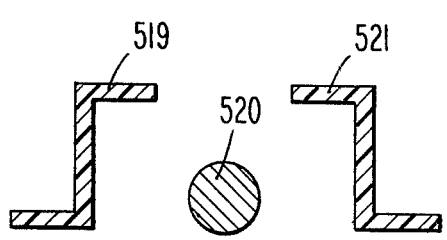

FIGS. 5d through 5g present different webbed beam constructions. FIG. 5d employs a "T"-section for straps 510 and 512. FIG. 5e shows an "I"-beam section for strap members 513 and 515. FIG. 5f employs an "H"-section for beams 517 and 518. FIG. 5g shows a right angled "Z"-section for beams 519 and 521.

In all of the embodiments illustrated in FIGS. 2a, 4, and 5c through 5g, the beams that comprise the straps are constructed to have thin walls (see 211, 212, 213, 411, 412, 413, the walls of the cylindrical configurations 507 and 508, and the legs and webs that comprise the various shaped sections of FIGS. 5d through 5g) as shown, and as distinguished from the solid strap sections of FIGS. 5a and 5b.

In summary, the present invention involves apparatus for mounting rotor blades to hubs in rotary wing aircraft systems, wherein a pair of integral, substantially parallel members are separated by a space occupied by a pitch shaft.

In more particular details, the present invention involves apparatus for mounting rotor blades to hubs in rotary wing aircraft systems, wherein a pair of substantially parallel, spaced apart strap members are each connected respectively to the hub and rotor blade, each strap member having a hollow, generally rectangular and at least partially opened cross section. A pitch shaft is mounted intermediate the strap members, rigidly mounted to the rotor blade and rotatably mounted relative to the hub. While the web opening of the strap members may constitute fully or partially open sides of an open, generally rectangular box beam, those openings are located on the outwardly facing surfaces of associated strap pairs.

It is understood that the foregoing presents particular embodiments of the principles of the present invention for illustrative purposes, and that numerous alternative embodiments will occur to those of ordinary skill in the art without departure from the spirit or scope of the present invention.

We claim:

1. In a rotary wing aircraft assembly including a rotor blade and a generally centrally located hub, apparatus for mounting the rotor blade to the hub comprising:
a pair of spaced-apart strap members, each being respectively connected to said rotor blade and said hub, and being substantially parallel to each other therebetween, with each of said strap members comprising an open beam of thin walled construction that in transverse cross-section terminates in at least two free edges, said edges being longitudinally extensive throughout substantially the length of the strap members and being located on diametrically opposed portions of the beams such that the strap members have longitudinal openings facing away from each other, with said strap members of said pair having specific predetermined bending and torsional flexure capabilities and being in unconnected relation to each other between the hub and the blade; and
means for changing the pitch of the rotary blade and thereby torsionally flexing said strap members.

2. Apparatus as claimed in claim 1, wherein each of said strap member in said pair is constructed to be substantially a mirror image of the other, in transverse cross-section.

3. Apparatus as claimed in claim 1, wherein the means for changing the pitch comprises a pitch shaft located between said strap members, rigidly connected to said rotor blade and extending toward said hub, and means for applying a predetermined rotational moment to said shaft.

4. Apparatus as claimed in claim 1, wherein each said strap member is of generally rectangular, hollow cross-section.

5. Apparatus as claimed in claim 1, wherein each said strap member is of generally rectangular, hollow cross-section, wherein each said strap member is substantially defined by horizontal surfaces and a substantially narrower vertical surface connecting said horizontal surfaces, defining a longitudinal opening extending substantially between the hub and said associated rotor blade.

6. Apparatus as claimed in claim 1, wherein each pair of strap members is connected to the hub at their centers, and is connected to a blade at their ends.

7. Apparatus as claimed in claim 1, adapted to a four bladed rotor, with each strap member being connected to a said hub at its center and with each strap member having two arms, each directed at substantially right angles to the other, with each arm of a given strap member being connected at its outer end to a different blade.

8. Apparatus as claimed in claim 1, wherein the said edges of each said strap member define a longitudinal slot.

9. Apparatus as claimed in claim 1, wherein each beam comprising a strap member is of generally annular cross-section terminating in said free edges.

10. Apparatus as claimed in claim 1, wherein said strap members are constructed of a composite fiberglass material.

11. Apparatus as claimed in claim 1, wherein said strap members each define "I"-beam configurations.

12. Apparatus as claimed in claim 2, wherein the means for changing the pitch comprises a pitch shaft located between said strap members rigidly connected to said rotor blade and extending toward said hub, and means for applying a predetermined rotational moment to said shaft.

13. Apparatus as claimed in claim 3, wherein said means for applying is connected at the end of the pitch shaft that is closest to said hub.

14. Apparatus as claimed in claim 3, wherein said pitch shaft is located substantially intermediate said strap members.

15. Apparatus as claimed in claim 4, wherein each said strap member is substantially defined by horizontal surfaces and a substantially narrower vertical surface connecting said horizontal surfaces.

16. Apparatus as claimed in claim 8, and adapted for a pair of oppositely mounted rotor blades, wherein said hub defines a connection area for receiving said strap members and wherein said strap members extend in both directions from said area to respective rigid connections at said oppositely mounted rotor blades.

17. Apparatus as claimed in claim 13, wherein said pitch shaft is rotatably mounted at said hub.

18. Apparatus as claimed in claim 15, wherein said horizontal surfaces taper in width between said hub and said associated rotor blade.

19. Apparatus as claimed in claim 15, wherein each said strap member is provided with projections that are parallel to said narrower said vertical surface, and that terminate in said free edges that define a longitudinal slot in said beam.

20. Apparatus as claimed in claim 15, wherein said free edges are defined by edges of said horizontal surfaces, and are free of a vertical surface parallel to said narrower vertical surface.

* * * * *